US005356565A

United States Patent [19]

Southwell

[11] Patent Number: 5,356,565

[45] Date of Patent: Oct. 18, 1994

[54] IN-LINE FOAM GENERATOR FOR HYDROCARBON RECOVERY APPLICATIONS AND ITS USE

[75] Inventor: George P. Southwell, Littleton, Colo.

[73] Assignee: Marathon Oil Company, Findlay, Ohio

[21] Appl. No.: 935,623

[22] Filed: Aug. 26, 1992

[51] Int. Cl.[5] .......................... B01F 5/06; B01J 13/00; F21B 43/12

[52] U.S. Cl. .................................... 252/307; 166/309; 252/8.554; 261/113; 261/DIG. 26; 366/340; 366/604

[58] Field of Search ............................ 252/8.554, 307; 166/309; 261/113, DIG. 26; 366/340, 604

[56] References Cited

U.S. PATENT DOCUMENTS

| | | | |
|---|---|---|---|
| 1,737,336 | 11/1929 | Sager | 261/125 |
| 1,780,573 | 11/1930 | Wager | 261/DIG. 26 |
| 1,970,082 | 8/1934 | Hansen-Ellehammer | 261/DIG. 26 |
| 2,229,441 | 1/1941 | Carlson | 261/124 |
| 2,391,110 | 12/1945 | Walker | 366/131 |
| 3,353,564 | 11/1967 | Bergeijk et al. | 138/41 |
| 3,388,868 | 6/1968 | Watson et al. | 261/DIG. 26 |
| 3,593,800 | 7/1971 | Hutchison | 166/312 |
| 3,963,463 | 6/1976 | Huppke | 55/178 |
| 4,084,795 | 3/1978 | Vaughn | 366/177 |
| 4,441,823 | 4/1984 | Power | 366/167 |
| 4,562,674 | 1/1986 | Nelson | 52/171 |
| 4,653,591 | 3/1987 | Marshall | 169/15 |
| 4,730,676 | 3/1988 | Luers et al. | 166/309 |
| 4,797,003 | 1/1989 | Cameron et al. | 366/101 |
| 4,869,849 | 9/1989 | Hirose et al. | 261/DIG. 26 |
| 4,874,248 | 10/1989 | Luetzelschwab | 366/307 |
| 5,000,262 | 3/1991 | Danzik | 252/8.554 X |
| 5,105,884 | 4/1992 | Sydansk | 166/270 |
| 5,129,457 | 7/1992 | Sydansk | 166/274 |

FOREIGN PATENT DOCUMENTS

| | | | |
|---|---|---|---|
| 0344399 | 12/1989 | European Pat. Off. | B01F 5/06 |
| 0118274 | 10/1978 | Japan | 261/113 |

OTHER PUBLICATIONS

Patent Abstracts of Japan, vol. 6, No. 68 (C-100) (946), Apr. 30, 1982.

*Primary Examiner*—Richard D. Lovering

[57] ABSTRACT

A foam generator is provided for in-line installation within a surface tubing network. The generator has a foaming chamber with a plurality of permeable screens positioned in series along a continuous flowpath through the foaming chamber. The screens are separated from one another by spacers that define the radial boundaries of the flowpath. According to one embodiment, the screens and spacers are mounted in a cartridge that fits into the foaming chamber to maintain proper screen alignment and facilitate removal of the screens from the chamber for maintenance. In an alternate embodiment, the screens and spacers are mounted directly in the chamber. In both embodiments, the screens are aligned orthogonal to the flowpath enabling the generator to produce a properly textured foam from shear-sensitive fluids with relatively little shear degradation. The foaming chamber exhibits a substantially uniform incremental pressure drop along any segment of its length and a minimum total pressure drop across its entirety as a function of the number of screens in the foaming chamber, the size and pattern of the openings through the screens, and the cross-sectional area of the flowpath delineated by the spacers.

21 Claims, 7 Drawing Sheets

IN-LINE FOAM GENERATOR FOR HYDROCARBON RECOVERY APPLICATIONS AND ITS USE

TECHNICAL FIELD

The present invention relates to a foam generator and more particularly to a foam generator for producing flowing foams free from substantial shear degradation which have specific utility in hydrocarbon recovery applications.

BACKGROUND OF THE INVENTION

Foams are known to have widespread utility in hydrocarbon recovery applications. For example, Petroleum Abstracts of U.S. Pat Nos. 4,797,003 and 4,730,676 indicate that foams can be employed as downhole cements and as fracturing fluids, respectively. It is further known that foams have utility for conformance improvement treatments and mobility control in conjunction with oil displacement flooding of subterranean oil-bearing formations. Foams used for conformance improvement and mobility control are typically fine-textured foams that contain shear-sensitive polymers. The polymers have high molecular weights and long chain lengths which impart desirable properties to foams for the specific hydrocarbon recovery applications set forth above.

Conventional processes for generating foams typically combine a liquid stream and a gas stream at high velocity and subject the combined streams to an abrupt and extreme pressure drop across a valve, a choke, or even a wire mesh screen. While such a technique is effective for rapidly generating foams, it can have harmful consequences for the generation of oilfield foams, and particularly for the generation of foams containing shear-sensitive components in the liquid stream. The abrupt pressure drop used to generate the foam creates high shear forces that substantially degrade the polymer entrained within the liquid phase of the foaming fluid, thus, rendering the foam less effective for its intended use.

As such, a foam generator and method of operating the same are needed which do not substantially degrade the shear-sensitive components of a foam generated thereby. Accordingly, it is an object of the present invention to produce a finely-textured foam from shear-sensitive fluids which exhibits relatively little shear degradation. It is further an object of the present invention to provide a foam generator having a modifiable structural configuration which enables the operator to maintain the pressure drop across the generator within prescribed limits under variable operating conditions. It is yet another object of the present invention to provide a foam generator that is operable in such a manner as to avoid abrupt incremental pressure drops, yet achieves a minimum total pressure drop across the entire generator.

SUMMARY OF THE INVENTION

The present invention is an apparatus and method for generating a foam, and particularly for generating a flowing foam having utility in hydrocarbon recovery applications. The apparatus and method are capable of generating the foam from shear-sensitive fluids without subjecting the fluids to high shear forces which would substantially degrade the fluids or resulting foam.

The present apparatus is a tubular-shaped foam generator provided with inlet and outlet fittings at opposite ends thereof for in-line installation within a surface tubing network. The tubing network links one or more surface reservoirs containing injection fluids with an injection wellbore penetrating a subterranean hydrocarbon-bearing formation. Thus, the tubing network, in combination with the injection wellbore, provides fluid communication between the injection fluid reservoirs and the subterranean formation.

To manufacture foams, the tubing network is further provided with a tee upstream of the foam generator. The tee joins a gas feed line and a liquid feed line at a right angle to form a foaming fluid line which contains the combined gas and liquid streams. The foaming fluid line discharges the combined streams into the foam generator through the inlet fitting thereof. Thus, in-line placement of the foam generator in the surface tubing network enables the operator to generate foam at the well site and place the fresh foam directly into the subterranean formation for hydrocarbon recovery applications.

The primary operational components of the foam generator are a plurality of permeable disk-shaped screens contained within a tubular-shaped foaming chamber. The screens are positioned in series along a continuous fluid flowpath through the chamber. According to one embodiment, the foaming chamber further contains a mounting cartridge to maintain the screens in alignment within the foaming chamber. The mounting cartridge includes a tubular sleeve enclosing the screens and a rod positioned along the longitudinal axis of the sleeve. The screens are aligned orthogonally to the axis of the sleeve and the rod passes through central mounting apertures provided in each of the screens. The ends of the rod are fixedly fastened to retention members at opposite ends of the sleeve, thereby preventing movement of the screens, rod and sleeve relative to each other.

The screens releasably and sealingly engage the inside wall of the tubular sleeve while the outside wall of the sleeve releasably and sealingly engages the inside wall of the foaming chamber. During operation of the foam generator, sealed engagement of the inside chamber wall with the outside sleeve wall prevents flow therebetween such that all flow through the chamber is across the permeable screens. However, when operation of the foam generator is suspended, the sleeve can be released from engagement with the wall to enable removal of the entire mounting cartridge, including the screens mounted therein, from the foaming chamber as a single unit for ease of screen maintenance or replacement.

A central spacer and a peripheral spacer are positioned between consecutive screens within the sleeve and sealingly engage the screens at the rod surface and the inner sleeve wall, respectively. The central and peripheral spacers have substantially the same thickness relative to each other, thereby establishing the spacing distance between consecutive screens bounding the spacers. The sum of all central and peripheral spacers form an annulus between them which defines the radial boundaries of the flowpath across the screens and correspondingly the cross-sectional area of the flowpath.

In an alternate embodiment of the foam generator of the present invention, the screens and spacers are stacked directly into the chamber without the use of a mounting cartridge. Only peripheral spacers are employed to separate consecutive screens. The peripheral spacers sealingly engage the wall of the chamber and define the radial boundary of the flowpath across the screens.

The structural configuration of both embodiments of foam generators recited above can be modified by the user as desired to achieve advantageous performance objectives during operation of the generator. As noted above, a particular performance objective of the present invention is to produce a properly textured foam from shear-sensitive fluids which exhibits relatively little shear degradation. In accordance with the invention, this objective is achieved by choosing a configuration of the foam generator such that the operational pressure drop across the generator falls within prescribed limits.

The operational pressure drop across the generator is characterized in terms of two parameters, i.e., the incremental pressure drop across any longitudinal segment of the generator and the total pressure drop across the entire length of the generator. Production of a foam exhibiting little or no shear degradation requires a relatively uniform incremental pressure drop across all longitudinal segments of the generator. This avoids a sharp pressure-drop spike near the generator inlet which undesirably shears the foam-forming fluids, as is frequently experienced in conventional foam generators. Production of a foam having an acceptable texture for hydrocarbon recovery applications requires that the total pressure drop across the generator exceed a predetermined minimum level, although the total pressure drop should not exceed the capacity of the process pumps.

The present invention recognizes a set of structural parameters, which can be selected in combination to achieve the desired performance objective of the foam generator. In particular, both a uniform incremental pressure drop and a minimum total pressure drop are achieved by selecting within experimentally predetermined limits taught by the present invention 1) the number of screens in the foaming chamber, 2) the size and pattern of the openings in the screens, and 3) the cross-sectional area of the flowpath through the chamber (which corresponds to the radial width of the spacers).

The invention will be further understood, both as to its structure and operation, from the accompanying drawings, taken in conjunction with the accompanying description, in which similar reference characters refer to similar parts.

DESCRIPTION OF PREFERRED EMBODIMENTS

Figure 1:
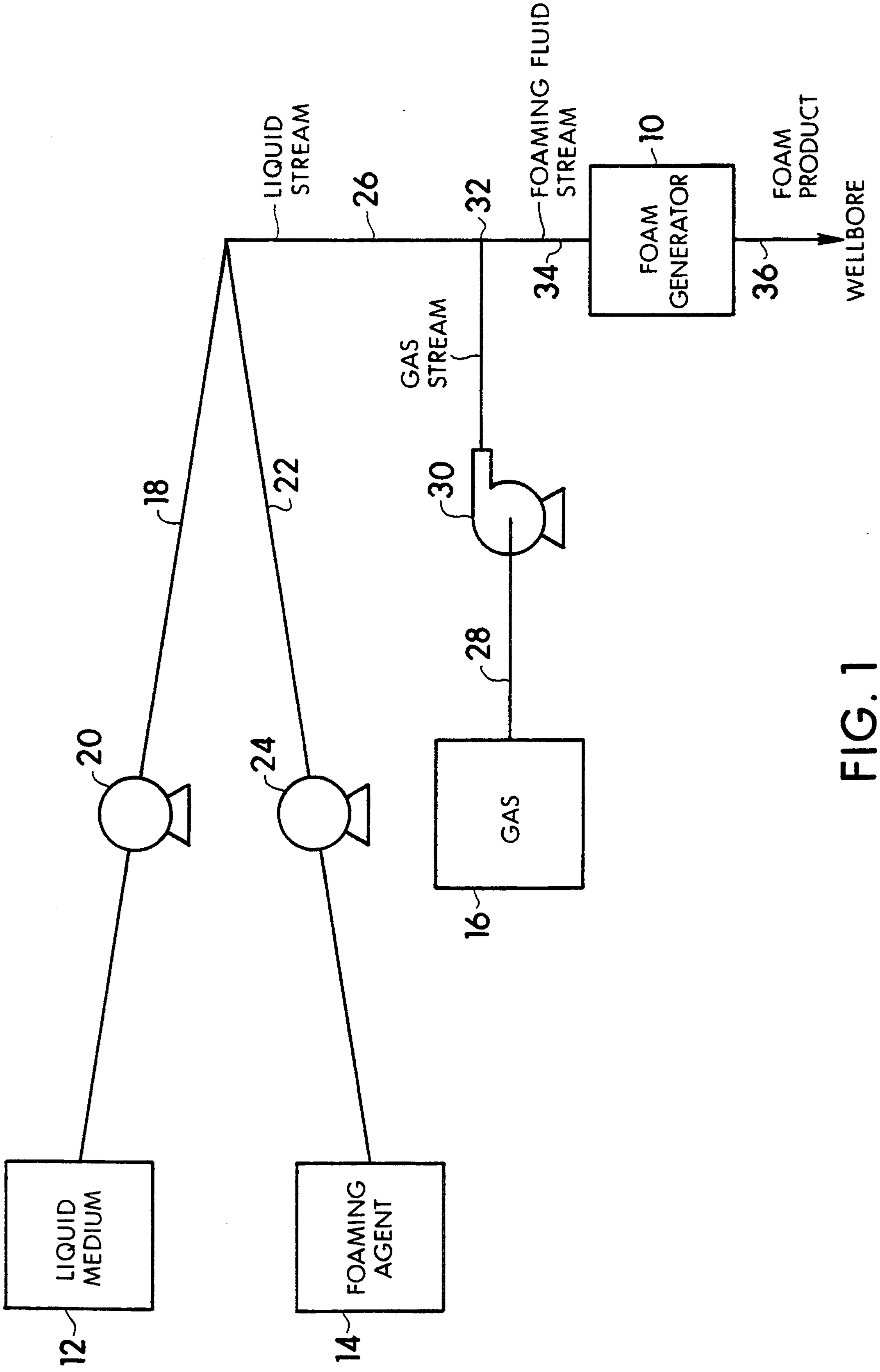
FIG. 1 is a schematic flow diagram of a foam manufacturing process.

Referring initially to FIG. 1, a generalized schematic flow diagram of a foam manufacturing process is shown. Included within the foam manufacturing process is the specific method of operating the foam generator 10 which is the subject of the present invention.

The starting materials for the foam manufacturing process include a liquid medium, a foaming agent, and a gas which are stored in reservoirs 12, 14, 16, respectively. The liquid medium is typically a shear-sensitive liquid, such as an aqueous polymer solution wherein the polymer contained therein is particularly susceptible to degradation by shear. Degradation of shear-sensitive polymers is evidenced by reduction of the polymer chain length which undesirably diminishes the effectiveness of the polymer solution in hydrocarbon recovery applications. Exemplary shear-sensitive polymers include long-chain acrylamide-containing polymers.

The term "aqueous polymer solution" is used broadly herein to encompass a polymer dissolved, suspended, or otherwise dispersed in an aqueous liquid wherein the polymer is crosslinked or substantially uncrosslinked. If the polymer is crosslinked, the aqueous polymer solution is more specifically termed a "gel", whereas if the polymer is substantially uncrosslinked, the solution is more specifically termed "polymer enhanced". The term "aqueous polymer solution" as used herein is inclusive of both "gels" and "polymer enhanced" solutions.

The foaming agent is any conventional cationic, anionic or nonionic surfactant capable of producing a foam in combination with the liquid medium and gas. Such surfactants are well known to those skilled in the art. Likewise, the gas is any conventional gas which is nonreactive with the other components of the foam and is capable of foaming the liquid medium and surfactant upon adequate mixing. Such gases are well known to those skilled in the art. Representative foam compositions that can be generated from shear-sensitive polymers using the apparatus and method of the present invention are the flowing foams taught by U.S. Pat. Nos. 5,105,884 and 5,129,457, and as such are incorporated herein by reference.

According to the foam manufacturing process of FIG. 1, the liquid medium is drawn from reservoir 12 through line 18 by a pump 20. The pump 20 pressurizes the liquid medium without subjecting it to undue shear forces and conveys the liquid medium through the process steps of the downstream tubing network. The foaming agent is similarly drawn from reservoir 14 through line 22 by a pump 24. Lines 18 and 22 exit pumps 20 and 24, respectively, and feed into a common liquid feed line 26 wherein the liquid medium and foaming agent form a combined liquid stream.

A gas stream is withdrawn from gas reservoir 16 and fed via gas feed line 28 to a gas compressor 30 wherein the gas stream is likewise pressurized. The gas feed line 28 converges into the liquid feed line 26 at a 90° angle creating a tee 32. The liquid and gas streams are combined in the tee 32 to form a foaming fluid stream which is the precursor of the foam product before the gas phase is fully dispersed throughout the liquid phase. The foaming fluid stream is conveyed from the tee 32 via a foaming fluid line 34 to foam generator 10.

Although not shown, a conventional static mixer may optionally be provided in foam fluid line 34 immediately upstream of foam generator 10 to provide partial premixing of the foaming fluid before entering generator 10. A foam product is generated in foam generator 10 in a manner described in greater detail hereafter. The foam product is withdrawn from generator 10 through foam product line 36 and fed directly to a fluid injection wellbore where it is injected into a subterranean hydrocarbon-bearing formation in fluid communication with the wellbore.

The injection parameters, such as injection rate and volume, are selected as a function of the particular hydrocarbon recovery application for which the foam is being used and are readily determinable by those skilled in the art. Specific applications for the foam generated by the apparatus and method of the present invention include mobility control, conformance improvement, and reduction of gas coning, to name but a few.

Figure 2:
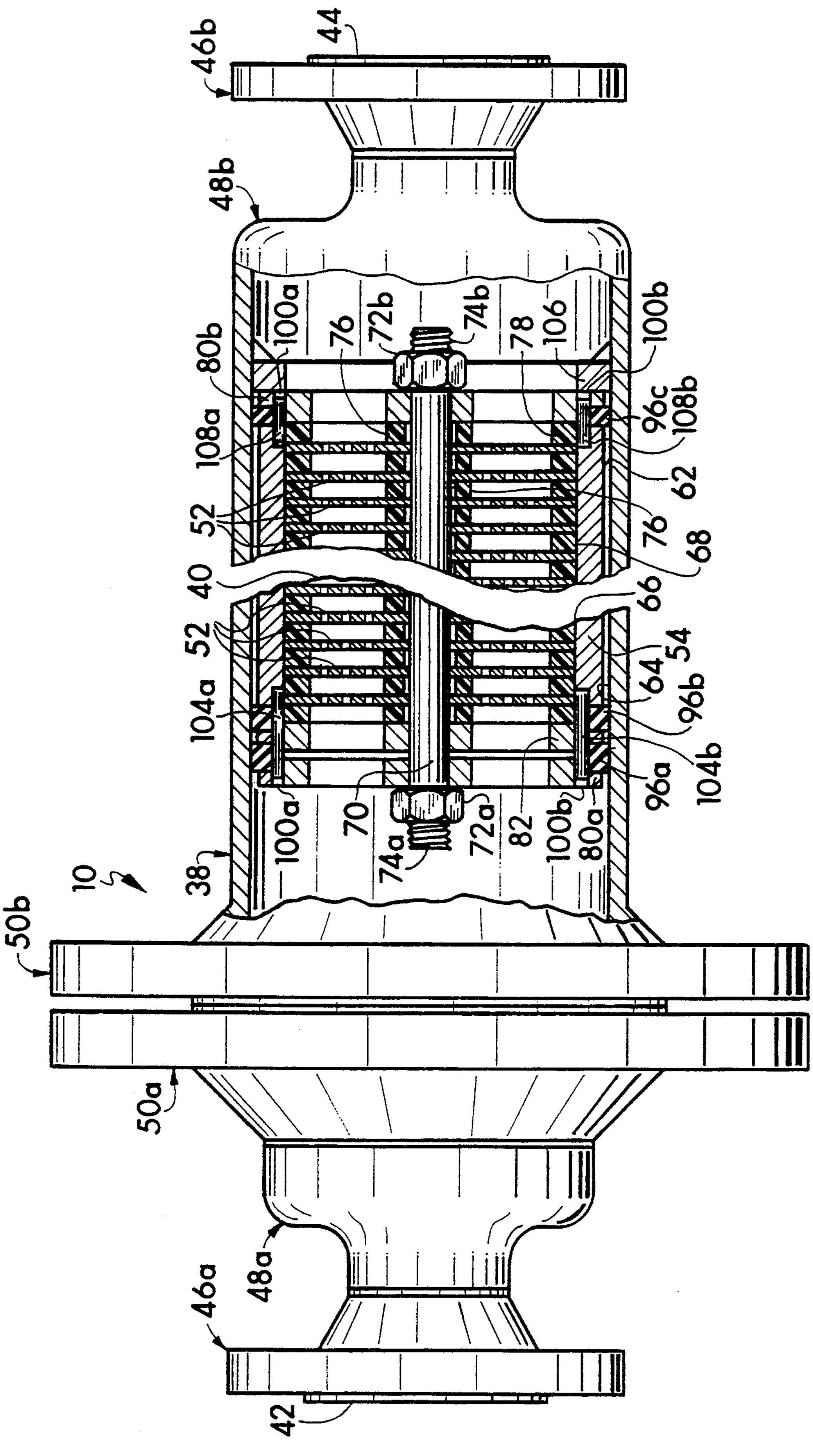
FIG. 2 is a perspective view of the foam generator of the present invention partially cut away to show the foaming chamber in cross-section.

A specific embodiment of the flow generator shown schematically in FIG. 1 is described hereafter with reference to FIGS. 2–7. Referring initially to FIG. 2, the flow generator is generally designated 10 and comprises a tubular body 38 enclosing a foaming chamber 40. Body 38 is formed from heavy gauge steel to withstand elevated fluid injection pressures and has an inlet 42 and an outlet 44 which are provided with a plurality of fittings to enable in-line installation of the generator 10 in a tubing network such as that shown in FIG. 1.

The fittings at inlet 42 include a connective flange **46*a*, a concentric reducer 48*a*, and a pair of access flanges 50*a*, 50*b*. The fittings at outlet 44 include a connective flange 46*b* and a concentric reducer 48*b* similar to those of inlet 42. Connective flanges 46*a*, 46*b* connect the generator 10 to the foaming fluid line 34 and the foam product line 36, respectively, of the tubing network shown in FIG. 1. Since the flowpath through generator 10 as illustrated has a greater diameter than the diameter of the flowpath through lines 34 and 36, reducers 48*a* and 48*b* are provided to adapt fluid flow therebetween. Access flanges 50*a*, 50*b* are provided in inlet 42 to enable access to the foaming chamber 40** for removal and maintenance of foam generating components that are contained therein, as described below.

The foaming chamber 40 provides a restricted flowpath wherein the gas and liquid phases of the foaming fluid completely mix to generate the foam product. The flowpath of chamber 40 has an elongate configuration to enclose the foam generating components therein and to achieve desired operational objectives as described hereafter. The flowpath of chamber 40 typically has a length to diameter ratio of at least about 2:1 and preferably at least about 4:1. For purposes of illustration, the chamber 40 of FIG. 2 has been cut through its midsection, but it is understood that chamber 40 is a continuous tube and that the foam generating components are continuously positioned along the length thereof.

Figure 3:
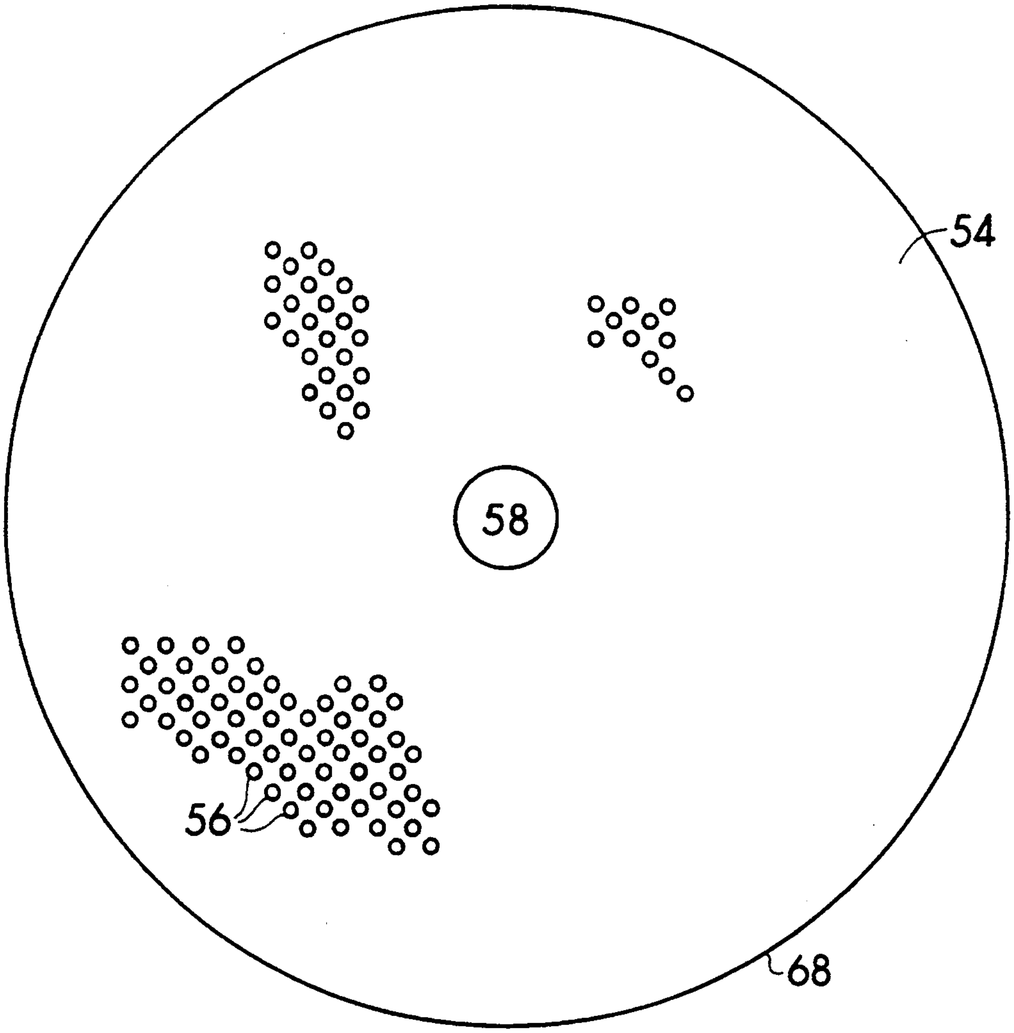
FIG. 3 is plan view of a screen utilized in the foam generator of FIG. 2.

The foam generating components comprise a plurality of screens 52 maintained within chamber 40 by means of a mounting cartridge 54. Each screen 52 is a thin stainless. steel disk-shaped plate perforated with a plurality of circular openings 56 as shown in FIG. 3. Openings 56 render screen 52 highly permeable to the foaming fluid and foam produced therefrom. Screen 52 is also provided with a central mounting aperture 58 to secure the screen 52 in the mounting cartridge 54.

The representative screen 52 shown in FIG. 3 has a thickness of about 0.7 mm, while the diameter of each opening is about 1.1 mm and the center spacing between the openings is about 1.7 mm. However, many other opening sizes and spacings are possible within the scope of the present invention, and are readily ascertainable by the skilled artisan applying the teaching disclosed herein. Furthermore, for purposes of illustration, only a representative number of openings 56 are shown in screen 52 of FIG. 3. However, it is understood that openings 56 in actuality are distributed uniformly across the entire face of screen 52.

Referring again to FIG. 2, mounting cartridge 54 is shown to have a tubular sleeve 60 fabricated from stainless steel which surrounds screens 52 and is slidably receivable within foaming chamber 40 after uncoupling access flanges **50*a*, 50*b*. The outside sleeve wall 62 is sized to engage the inside chamber wall 64, while the inside sleeve wall 66 is sized to engage the screen periphery 68 (referenced in FIG. 3), thereby channeling all fluid flow through generator 10 into screen openings 56**.

Screens 52 are positioned at predetermined intervals within sleeve 60 and have their faces aligned orthogonal to the longitudinal axis of sleeve 60 as well as to the flowpath therethrough. The alignment of screens 52 within sleeve 60 is secured by an axial mounting rod 70 passing through central mounting apertures 58 and having retaining nuts **72*a*, 72*b* threaded onto ends 74*a*, 74*b*, respectively. The alignment intervals of screens 52 are determined by the thickness of a pair of ring-shaped spacers fitting snugly between each screen. Each spacer pair comprises a small central spacer 76 receiving and sealingly abutting rod 70, and a large peripheral spacer 78 received by and sealingly abutting inside sleeve wall 66, thereby preventing the foaming fluid from bypassing the flowpath of openings 56, insofar as spacers 76 and 78** are substantially impermeable to the foaming fluid and foam produced therefrom.

Figure 5A:
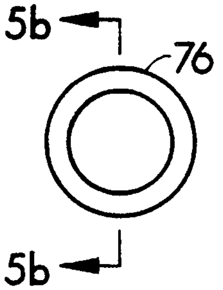
FIG. 5*a* is plan view of a central spacer utilized in the foam generator of FIG. 2.
Figure 5B:
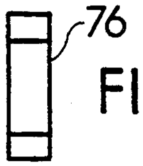
FIG. 5*b* is cross-sectional view of the central spacer as shown along line 5*b*—5*b* in FIG. 5*a*.
Figure 4A:
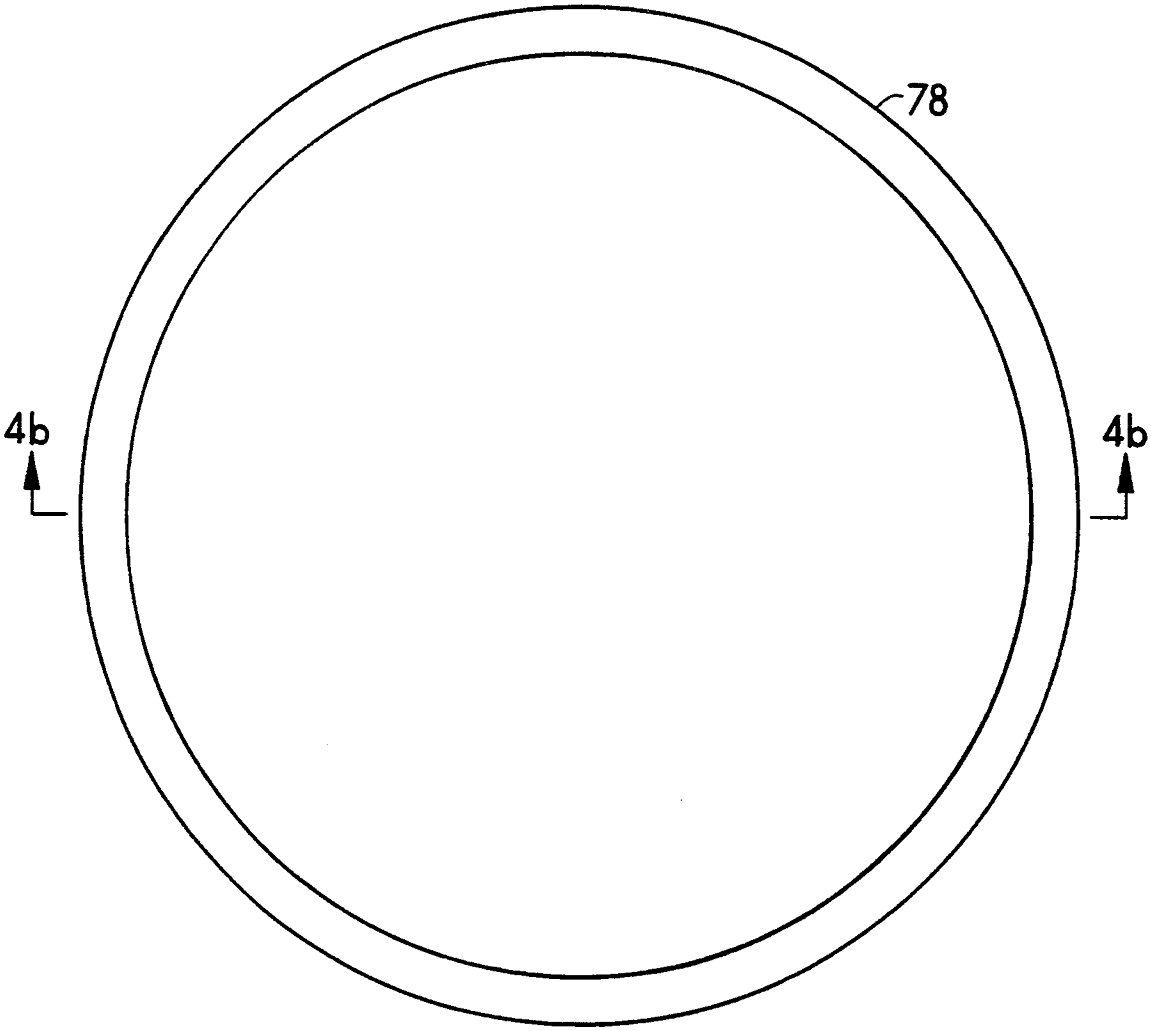
FIG. 4*a* is plan view of a peripheral spacer utilized in the foam generator of FIG. 2.
Figure 4B:
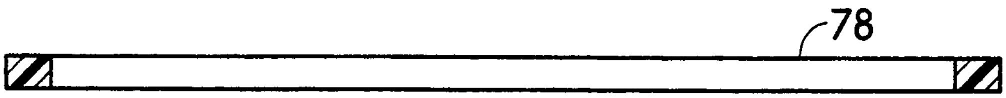
FIG. 4*b* is cross-sectional view of the peripheral spacer as shown along line 4*b*—4*b* in FIG. 4*a*.
Figure 6A:
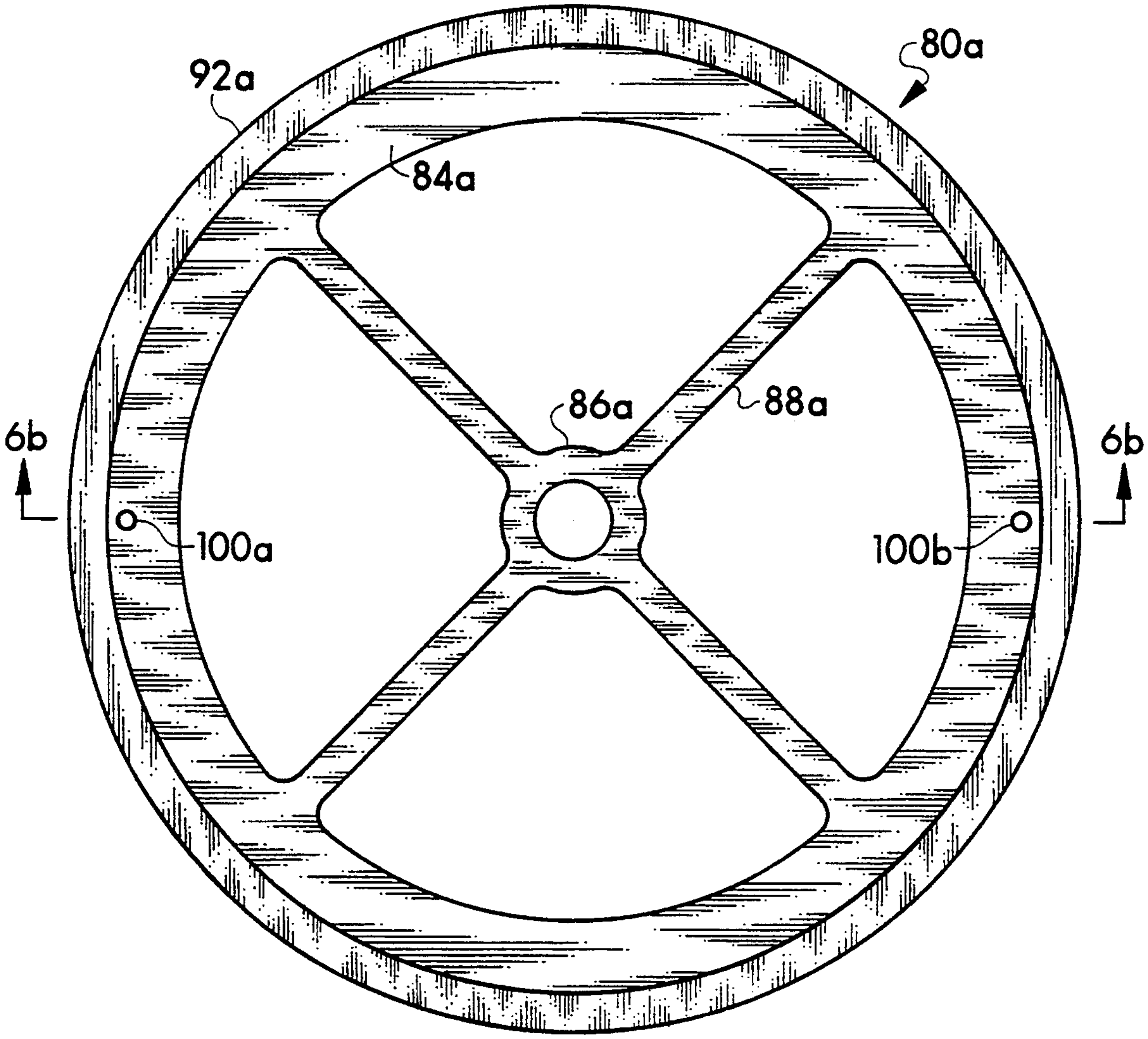
FIG. 6*a* is plan view of an outside retainer utilized in the foam generator of FIG. 2.
Figure 6B:
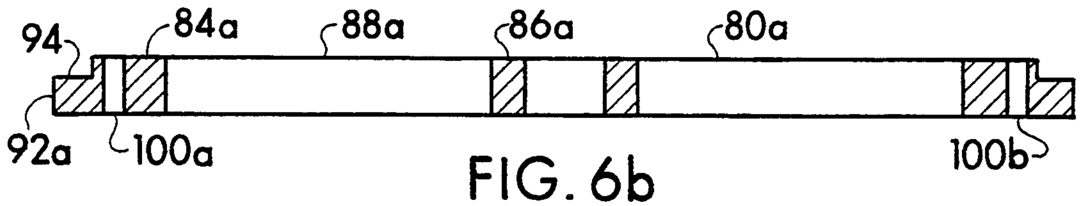
FIG. 6*b* is cross-sectional view of the outside retainer as shown along line 6*b*—6*b* in FIG. 6*a*.
Figure 7A:
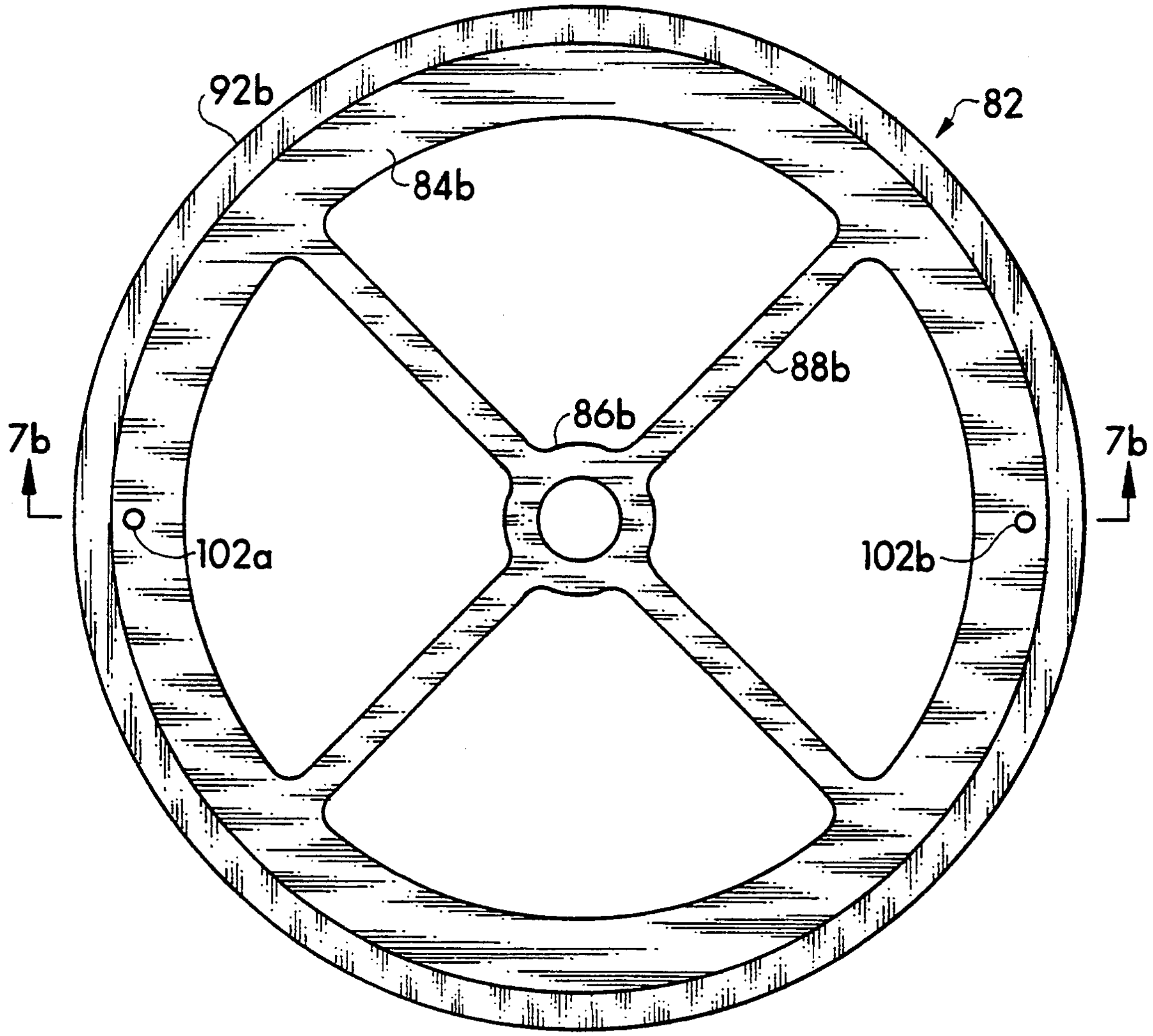
FIG. 7*a* is plan view of an inside retainer utilized in the foam generator of FIG. 2.
Figure 7B:
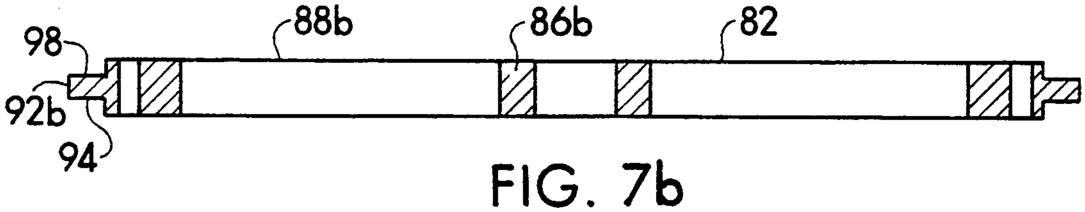
FIG. 7*b* is cross-sectional view of the inside retainer as shown along line 7*b*—7*b* in FIG. 7*a*.

Peripheral spacer 78 and central spacer 76 are shown in greater detail with reference to FIGS. **4*a* and 4*b* and FIGS. 5*a* and 5*b*, respectively. Spacers 78, 76 may be fabricated from materials such as stainless steel, composites, hard rubber, or plastic, but are preferably fabricated from relatively rigid PVC. All spacers 78, 76 preferably have substantially the same thickness for uniform spacing of screens 52. A preferred spacing interval is on the order of at least about 1 mm, and more preferably at least about 5 mm. As shown in FIG. 3, screens 52 and spacers 76 and 78 are mounted within sleeve 60 in a sandwich configuration, wherein the sequence of a screen 52 followed by a spacer pair 76, 78 is repeated continuously until the desired number of screens 52 are mounted within sleeve 60**.

It is further apparent from FIG. 3 that the cross-sectional area of the foaming fluid flowpath through openings 56 can be adjusted by selecting the radial width of spacers 76, 78 so as to modify the size of the annulus between them as desired. Thus, for example, by increasing the radial width of peripheral spacer 78 toward its central axis and/or increasing the radial width of central spacer 76 away from its axis, the peripheral radius of the annulus is decreased and/or the central radius of the annulus is increased. Accordingly, the cross-sectional area of the flowpath is diminished. Conversely, by decreasing the radial width of peripheral spacer 78 away from its central axis and/or decreasing the radial width of central spacer 76 toward its axis, the peripheral radius of the annulus is increased and/or the central radius of the annulus is decreased. Accordingly, the cross-sectional area of the flowpath is increased.

Retention of screens 52 within sleeve 60 is secured proximal the generator inlet 42 by means of an outer retention member 80*a* and an inner retention member 82 in cooperation with the rod 70 and retention nut 72*a*. Outer and inner retention members 80*a*, 82 are rigid structures fabricated from stainless steel. As shown in FIGS. 6*a* and 6*b* and FIGS. 7*a* and 7*b*, outer and inner retention members 80*a*, 82 are similarly configured with outer rings 84*a*, 84*b* and inner rings 86*a*, 86*b* connected by spokes 88*a*, 88*b*, respectively. Inner rings 86*a*, 86*b* receive rod 70, and nut 72*a* is threaded onto end 74*a* of rod 70. Nut 72*a* is tightened up against inner ring 86*a* for secure retention of screens 52 and central spacers 76 on rod 70. Outer rings 84*a*, 84*b* secure screen peripheries 68 and peripheral spacers 78.

Outer rings 84*a* and 84*b* differ from one another only in the configuration of their peripheral edges 92*a* and 92*b*. Peripheral edge 92*a* aligns with edge 92*b* to form a first slot 94 for receiving an elastomeric sealing ring 96*a*, and edge 92*b* aligns with sleeve 60 to form a second slot 98 for receiving an elastomeric sealing ring 96*b*. Also formed through outer ring 84*a* are holes 100*a*, 100*b* that align with holes 102*a*, 102*b* formed through outer ring 84*b* to press fittingly receive stainless steel retention pins 104*a*, 104*b* as shown in FIG. 3.

Retention of screens 52 within sleeve 60 is secured proximal the generator outlet 44 by means of an outer retention member 80*b* and a containment ring 106 in cooperation with rod 70 and nut 72*b*. Outer retention member 80*b* is substantially identical to outer retention member 80*a*. Inner ring 86*a* of outer retention member 80*b* receives rod 70, and nut 72*b* is threaded onto end 74*b* of rod 70. Nut 72*b* is tightened up against inner ring 86*a* for secure retention of screens 52 and central spacers 76 on rod 70, while outer ring 84*a* of member 80*b* secures screen peripheries 68 and peripheral spacers 78.

Containment ring 106 is a stationary steel ring permanently affixed to the inside chamber wall 64 which acts as a stop for mounting cartridge 54 when it is slid into foaming chamber 40 through access-flange 50*b* during assembly. Accordingly, mounting cartridge 54 is in an operational position when the outer ring 84*a* of outer retention member 80*b* firmly abuts containment ring 106. In a manner similar to outer retention member 80*a*, edge 92*b* of outer retention member 80*b* aligns with sleeve 60 to form slot 98 for receiving elastomeric sealing ring 96*c* and holes 100*a*, 100*b* of outer retention member 80*b* press fittingly receive stainless steel retention pins 108*a*, 108*b*, which are somewhat shorter than retention pins 104*a*, 104*b*, as shown in FIG. 3.

Retention members 80*a*, 80*b*, 82, retention pins 104*a*, 104*b*, and sealing rings 96*a*, 96*b*, 96*c* cooperate with one another both to prevent flow between outside sleeve wall 62 and inside chamber wall 64 and to secure mounting cartridge 54 in its operational position within foaming chamber 40. After sliding cartridge 54 against containment ring 106 in chamber 40, retention nut 72*a* is tightened to drive retention members 80*a* and 82 longitudinally inward and compress slots 94 and 98. Accordingly, sealing rings 96*a*, 96*b*, which are bound by slots 94, 98 and pins 104*a*, 104*b*, radially expand against inside chamber wall 64, securing cartridge 54 in chamber 40. Likewise, retention nut 72*b* is tightened to drive retention members 80*b* longitudinally inward and compress slot 94 of member 80*b*, thereby causing sealing ring 96*c* to radially expand against inside chamber wall 64. Mounting cartridge 54 can be released for removal from chamber 40 simply by loosening nuts 72*a*, 72*b* to relax sealing rings 96*a*, 96*b*, 96*c*.

Figure 8:
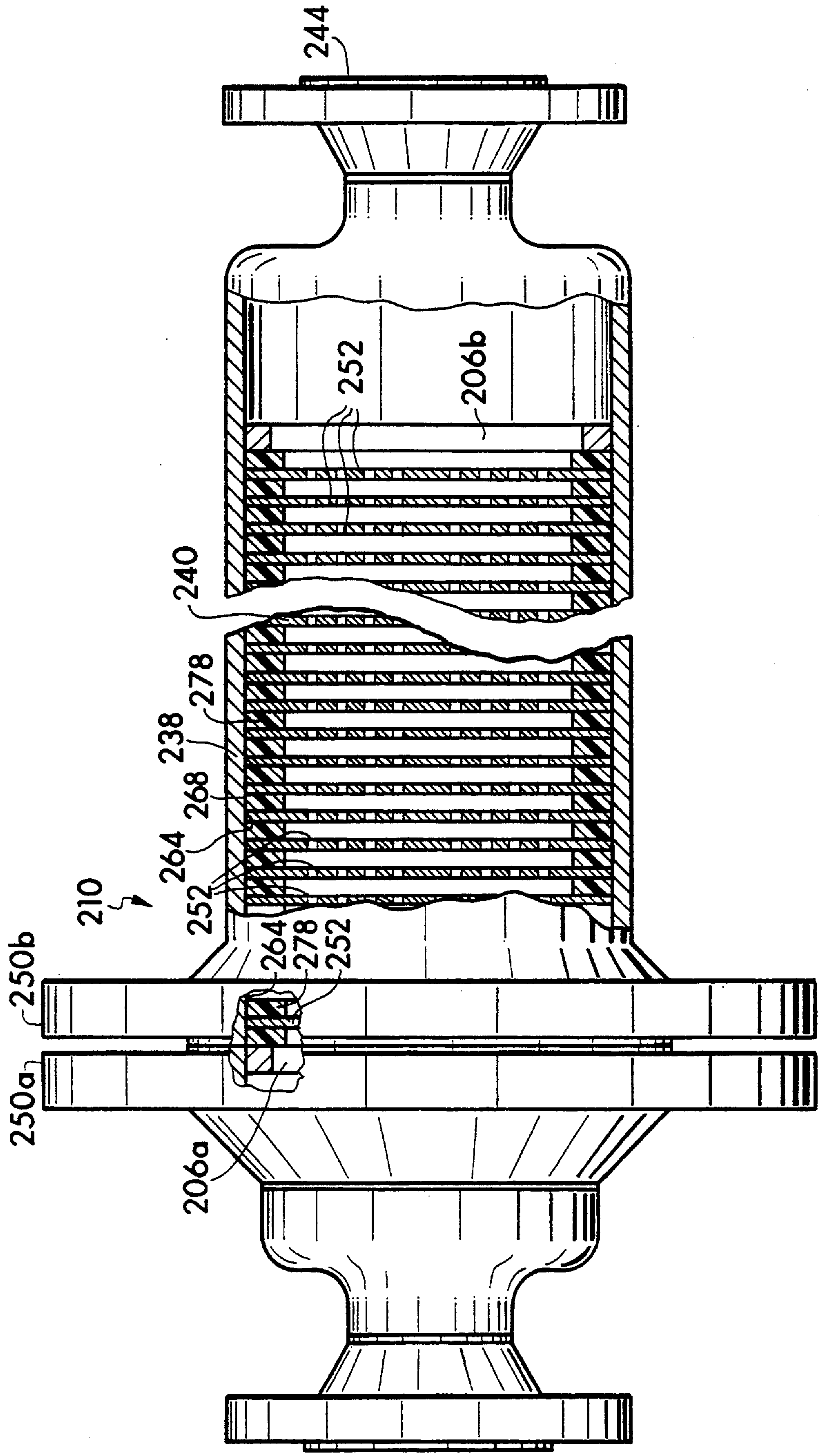
FIG. 8 is a perspective view of an alternate embodiment of the foam generator of the present invention partially cut away to show the foaming chamber in cross-section.

Referring to FIG. 8, another embodiment of the foam generator of the present invention is shown and generally designated 210. The inlet and outlet fittings, body 238, foaming chamber 240 and screens 252 of generator 210 are substantially identical to those of generator 10. However, generator 210 is not provided with a mounting cartridge to maintain the screens 252 in alignment within foaming chamber 240. Instead screens 252 are stacked directly into the chamber 240 with their peripheries 268 engaging inside chamber wall 264 and a single peripheral spacer 278 is employed to separate consecutive screens 252 which sealingly engages wall 264. It is noted that screens 252 and spacers 278 have diameters greater than their corresponding components in generator 10 to enable the modified configuration of generator 210. Furthermore, spacer 278 has a greater radial width and screens 252 are somewhat thicker to compensate for the absence of central spacers in generator 210.

For assembly of generator 210, screens 252 and spacers 278 are inserted into chamber 240 through access flange 250*b* and stacked in sequence from the containment ring 206*b* proximal to generator outlet 244 until they are flush with access flange 250*b*. Access flanges 250*a* and 250*b* are then joined together. Access flange 250*a* is provided with a containment ring 206*a* which, in cooperation with containment ring 206*b*, maintains screens 252 in fixed alignment within foaming chamber 240. To remove screens 252 from chamber 240, flanges 250*a* and 250*b* are simply separated from one another to access the screens 252 through flange 250*b* in the same manner as assembly.

METHOD OF OPERATION

Operation of foam generators 10 and 210 is essentially the same, and accordingly is described hereafter with reference to both. The principle objective of operation is to produce a uniform finely-textured foam from shear-sensitive fluids which exhibits relatively little shear degradation. A preferred foam has a foam quality (volume percent gas) between about 70 and 90% and has the consistency and appearance of a conventional aerosol shaving cream.

This operational objective is achieved by adjusting the configuration of the foam generator such that the incremental pressure drop across any longitudinal segment of the generator is relatively uniform, i.e., the pressure drop per unit length is substantially the same for any given length of the generator. As such, sharp pressure drop increases are avoided within the generator, particularly proximal to the generator inlet. Additionally, the generator is configured such that the total pressure drop across the entire length of the generator exceeds a minimum level of about 345 kPa, and preferably about 690 kPa. Finally, it is preferred that the total pressure drop does not exceed about 2070 kPa, and more preferably about 1380 kPa.

The structural parameters of the present foam generator that are adjustable to achieve the above-recited pressure characteristics include the number of screens in the foaming chamber, the size and pattern of the openings in the screens, and the radial width of the spacers between the screens, i.e., cross-sectional area of the foaming fluid flowpath. It has been experimentally determined that each screen produces a pressure drop of about 3.45 kPa wherein the screens are configured as shown in FIG. 3 and the cross-sectional area of the flowpath across the screens is about 100 $cm^2$. Consequently, under these specific conditions, between about 100 and about 400 screens, and preferably about 200 screens are required to obtain the desired foam product.

It is apparent that by altering the presently disclosed screen configuration and/or the flowpath cross-sectional area, the above-recited ranges for number of screens may vary. Additional acceptable ranges for screen number, however, can readily be determined for other screen configurations or flowpath cross-sectional areas by one skilled in the art applying the teaching disclosed herein. In any case, at least about 10 screens, and preferably between about 50 and 500 screens, are required to be mounted in series within the foaming chamber for purposes of the present invention and a flowpath cross-sectional area is selected between about 50 to 1000 $cm^2$, and preferably between about 100 and 300 $cm^2$.

The following examples demonstrate the practice and utility of the present invention, but are not to be construed as limiting the scope thereof.

EXAMPLE 1

A volume of about 83,000 reservoir barrels of a polymer enhanced foam is prepared using a foam generator of the type shown in FIG. 8 in accordance with the method of the present invention. The liquid phase of the foaming fluid is prepared by premixing a surfactant and a polymer in an aqueous solvent. The solvent is a produced water with a total dissolved solids concentration of 5800 ppm, a hardness of 740 ppm, and high concentrations of $HCO_3^-$ and $SO_4^-$. The surfactant is a $C_{14-16}$ alpha olefin sulfonate having a concentration of 2000 ppm in the liquid phase. The polymer is a partially hydrolyzed polyacrylamide (PHPA) that is 30% hydrolyzed and has a molecular weight of about 11,000,000. About 16,350 kg of PHPA are present in the liquid phase at a concentration of about 6000 ppm. The gas phase is a produced gas.

The liquid phase is prefiltered through a 35 mesh stainless steel wire screen. Thereafter, the liquid phase and gas phase are premixed by means of an in-line static mixer just ahead of the foam generator to form a foaming fluid. The foaming fluid is then passed through the foam generator which contains 200 stainless steel screens having substantially the same configuration as shown in FIG. 3. The thickness of each screen is about 1.6 mm and the peripheral spacers have an inside diameter of about 11.4 cm which is corresponds identically to the flowpath cross-sectional area. The generator exhibits a relatively uniform incremental pressure drop distribution along its length and the total pressure drop across the generator ranges from 520 to 1390 kPa.

The foam product obtained from the generator has an average quality of 77% and is uniformly and finely textured with the consistency and appearance of an aerosol shaving cream. The foam is injected into a single injection well in fluid communication with a fractured carbonate reservoir containing a relatively viscous oil as a conformance improvement treatment for the purpose of recovering oil from the fracture network. The injection wellhead pressure ranges from about 4140 to about 6980 kPa, while the reservoir pressure is about 3790 kPa. The injection rate into the injection well is about 1000 barrels per day.

EXAMPLE 2

A volume of about 1,000 reservoir barrels of a foamed polymer gel is prepared in the same manner as Example 1. The aqueous solvent of the liquid phase is a produced water with a total dissolved solids concentration of 10,000 ppm, a hardness of 520 ppm, and high concentrations of $HCO_3^-$ and $SO_4^-$. The surfactant is the same $C_{14-16}$ alpha olefin sulfonate having a concentration of 3000 ppm in the liquid phase. The polymer is a partially hydrolyzed polyacrylamide (PHPA) that is about 7.5% hydrolyzed and has a molecular weight of about 12,000,000 to 15,000,000. The PHPA concentration in the liquid phase is about 9000 ppm and the crosslinking agent is chromic acetate at a concentration of about 750 ppm. The gas phase is nitrogen.

The foaming fluid is passed through the foam generator of Example 1. The generator exhibits a relatively uniform incremental pressure drop distribution along its length and the total pressure drop across the generator remains around 1035 kPa. The foam product obtained from the generator has an average quality of 80% and is uniformly and finely textured with the consistency and appearance of an aerosol shaving cream. The foam is injected into a single injection well in fluid communication with a fractured carbonate reservoir for the purpose of reducing gas coning via fractures. The injection wellhead pressure ranges from about 4140 to about 4830 kPa, while the reservoir pressure is about 3100 kPa. The injection rate into the injection well is about 1800 barrels per day.

While the forgoing preferred embodiments of the invention have been described and shown, it is understood that alternatives and modifications, such as those suggested and others, may be made thereto and fall within the scope of the invention.

I claim:

1. A foam generator for producing a foam from a foaming fluid, said foam having utility in hydrocarbon recovery applications, said foam generator comprising:

a foaming chamber having an inside chamber wall, an inlet, an outlet, and a continuous flowpath from said inlet to said outlet, said flowpath contained within said inside wall;

a plurality of screens substantially permeable to said foam and said foaming fluid positioned in series within said foaming chamber across said flowpath, wherein each said screen has a peripheral portion and a central portion;

a plurality of first spacers having a first radial width, each said spacer positioned between consecutive screens and separably engaging each said screen, said first radial width defining a cross sectional area and a radial boundary of said flowpath in substantial parallel alignment with the axis of said foaming chamber; and a plurality of second spacers positionably interchangeable with said plurality of first spacers, said plurality of second spacers having a second radial width defining a smaller or larger cross sectional area of said flowpath than said first radial width.

2. A foam generator as recited in claim 1 wherein said plurality of screens are aligned substantially orthogonal to said flowpath.

3. A foam generator as recited in claim 1 wherein said plurality of first or second spacers is a plurality of peripheral spacers, each said peripheral spacer engaging said peripheral portion of each said screen, and further wherein said radial boundary of said flowpath is a peripheral radial boundary and said plurality of peripheral spacers define said peripheral radial boundary.

4. A foam generator as recited in claim 3 further comprising a plurality of central spacers, each said central spacer engaging said central portion of each said screen, and further wherein said radial boundary of said flowpath is a central radial boundary and said plurality of central spacers define said central radial boundary.

5. A foam generator as recited in claim 4 wherein said plurality of central spacers are substantially impermeable to said foam and said foaming fluid.

6. A foam generator as recited in claim 3 wherein said plurality of peripheral spacers are substantially impermeable to said foam and said foaming fluid.

7. A foam generator as recited in claim 1 wherein said plurality of first or second spacers is a plurality of central spacers, each said central spacer engaging said central portion of each said screen, and further wherein said radial boundary of said flowpath is a central radial boundary and said plurality of central spacers define said central radial boundary.

8. A foam generator as recited in claim 7 wherein said plurality of central spacers are substantially impermeable to said foam and said foaming fluid.

9. A foam generator as recited in claim 1 wherein each said screen is a perforated plate.

10. A foam generator as recited in claim 1 further comprising a sleeve having an inside sleeve wall and an outside sleeve wall, said outside sleeve wall engaging said inside chamber wall and wherein said plurality of screens are mounted within said sleeve.

11. A foam generator for producing a foam from a foaming fluid, said foam having utility in hydrocarbon recovery applications, said foam generator comprising:

a foaming chamber having an inside chamber wall, an inlet, an outlet, and a continuous flowpath from said inlet to said outlet, said flowpath contained within said inside wall;

a plurality of screens substantially permeable to said foam and said foaming fluid positioned in series within said foaming chamber substantially orthogonal to said flowpath, wherein each said screen has a peripheral portion and a central portion;

a plurality of first peripheral spacers substantially impermeable to said foam and said foaming fluid, each said first peripheral spacer positioned between consecutive said screens, separably engaging said peripheral portion of each said screen, and having a first peripheral radial width defining a cross sectional area and a first peripheral radial boundary of said flowpath in substantial parallel alignment with the axis of said foaming chamber;

a plurality of first central spacers substantially impermeable to said foam and said foaming fluid, each said first central spacer positioned between consecutive screens, separably engaging said central portion of each said screen, and having a first central radial width further defining said cross sectional and a first central radial boundary of said flowpath in substantial parallel alignment with the axis of said foaming chamber;

a sleeve having an inside sleeve wall and an outside sleeve wall, said outside sleeve wall engaging said inside chamber wall, wherein said plurality of screens, first peripheral spacers, and first central spacers are mounted within said sleeve; and a plurality of second spacers positionably interchangeable with said plurality of first peripheral or central spacers, said plurality of second spacers having a second peripheral or central radial width defining a smaller or larger cross sectional area of said flowpath than said first perpheral and central; radial widths.

12. A method of manufacturing a foam from a foaming fluid for use in hydrocarbon recovery applications, said method comprising:

preparing said foaming fluid by combining an aqueous solution of a shear-sensitive polymer, a foaming agent and a gas;

conveying said foaming fluid through a flowpath having a plurality of fluid permeable screens consecutively positioned in series, wherein said flowpath has a cross sectional area having a first radial boundary defined by a first radial width of a plurality of first spacers, each of said plurality of first spacers positioned between a consecutive pair of said plurality of screens and separably engaging each screen of said consecutive pair to maintain a substantially uniform incremental pressure drop across said plurality of screens; and adjusting said cross sectional area of said flowpath by substituting a plurality of second spacers for said plurality of first spacers, said plurality of second spacers having a second radial width defining a second radial boundary of said cross sectional area to modify said substantially uniform incremental pressure drop across said plurality of screens.

13. A method of manufacturing a foam as recited in claim 12 wherein any shear forces produced across said plurality of screens are insufficient to substantially degrade said shear-sensitive polymer.

14. A method of manufacturing a foam as recited in claim 12 wherein said foaming fluid further has a polymer crosslinking agent combined therein.

15. A method of manufacturing a foam as recited in claim 12 wherein each screen of said consecutive pair is separated a spacing distance defined by the width of said plurality of first spacers or the width of said plurality of second spacers.

16. A method of manufacturing a foam as recited in claim 15 wherein said spacing distance is at least about 1 mm.

17. A method of manufacturing a foam as recited in claim 12 wherein said plurality of screens is at least about 10.

18. A method of manufacturing a foam as recited in claim 12 wherein said plurality of screens is at least about 100.

19. A method of manufacturing a foam as recited in claim 12 wherein the total pressure drop across said plurality of screens is at least about 340 kPa.

20. A method of manufacturing a foam as recited in claim 12 wherein said plurality of first spacers and said plurality of second spacers are peripheral spacers separably engaging a peripheral portion of each screen of said consecutive pair such that said first radial boundary is a first peripheral radial boundary and said second radial boundary is a second peripheral radial boundary of said cross sectional area, and further wherein said cross sectional area is decreased by decreasing said second peripheral radial boundary relative to said first peripheral radial boundary and said cross sectional area is increased by increasing said second peripheral radial boundary relative to said first peripheral radial boundary.

21. A method of manufacturing a foam as recited in claim 12 wherein said plurality of first spacers and said plurality of second spacers are central spacers separably engaging a central portion of each screen of said consecutive pair such that said first radial boundary is a first central radial boundary and said second radial boundary is a second central radial boundary of said cross sectional area, and further wherein said cross sectional area is decreased by increasing said second central radial boundary relative to said first central radial boundary and said cross sectional area is increased by decreasing said second central radial boundary relative to said first central radial boundary.

* * * * *